April 4, 1939.  G. T. MACFARLANE  2,153,469
WINCH GEAR FOR HAULING, CARGO WORKING, AND LIKE PURPOSES
Filed June 24, 1937  4 Sheets-Sheet 3
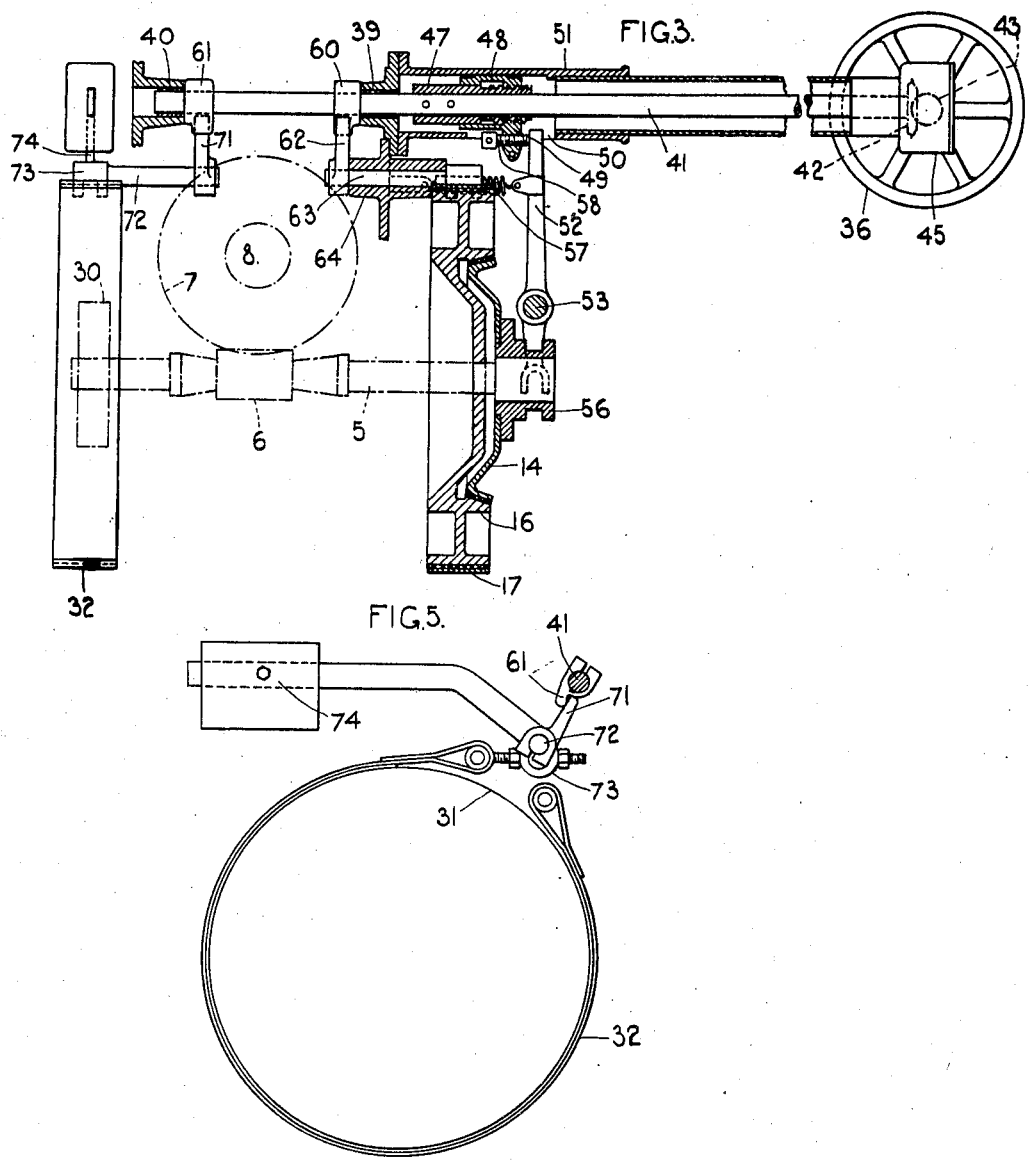
George Thomas MacFarlane
by Ernest T. Mechlin
his Attorney April 4, 1939. G. T. MACFARLANE 2,153,469
WINCH GEAR FOR HAULING, CARGO WORKING, AND LIKE PURPOSES
Filed June 24, 1937 4 Sheets-Sheet 4
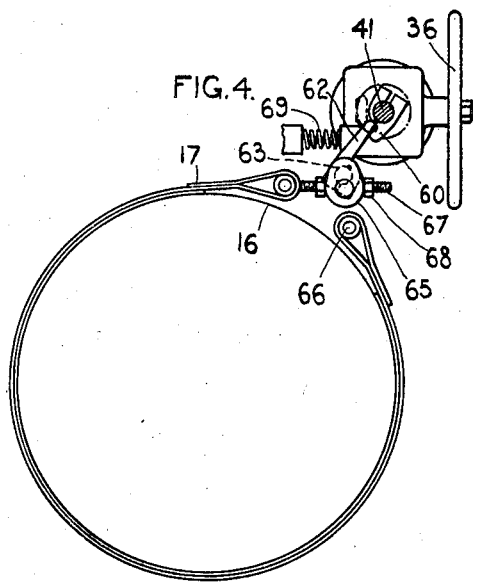
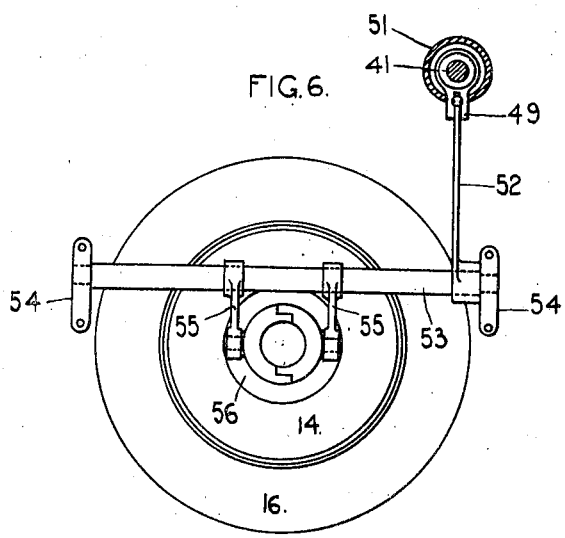

Patented Apr. 4, 1939

2,153,469

UNITED STATES PATENT OFFICE 2,153,469

WINCH GEAR FOR HAULING, CARGO WORKING, AND LIKE PURPOSES

George Thomas Macfarlane, Northwood, England, assignor of one-half to The General Electric Company Limited, London, England, a corporation of Great Britain Application June 24, 1937, Serial No. 150,204
In Great Britain June 2, 1936

4 Claims. (Cl. 192—4)

This invention relates to winchgear for hauling, cargo working and like purposes, with more especial reference to single barrel or single drum winches or those made up of a plurality of single drum units.

In British patent specification No. 404,158, winch gear for operating a cargo derrick is described, including co-axial derricking and hoisting drums, clutches and reduction gearing for selectively driving said drums from a shaft in turn driven through reduction gearing for rotation to raise the derrick and load respectively or to top the derrick while the load is being lowered, such clutches and the brakes for controlling lowering movements being located on said shaft, whereby they are subjected to lighter load and control of the winch is enhanced.

In accordance with the present invention, winch gear having a drum or barrel with or without warp ends includes double reduction or worm gearing coupling the main or power shaft with the drum and combined clutch and differential gear connecting said main or power shaft with its prime mover, e. g., an electric motor.

The drum or barrel shaft may be disposed co-axially with the shaft of the driving motor, although preferably it is arranged at right angles thereto, the main shaft being furnished with a worm driving a worm wheel on the drum shaft and such main shaft being continued to mount an external holding and lowering brake including a unidirectional clutch or free wheel.

The combined clutch and differential gearing coupling the main or power shaft with its driving motor, is conveniently housed in one end of the casing forming a gear box for the worm drive, and the control of the winch is preferably such as to provide for reversal in the direction of rotation of the drum as also to give the utmost flexibility of regulation when overhauling or under load, the differential and associated worm reduction gear between the main shaft and the drum being of great assistance to this end.

According to one specific embodiment of electric motor driven winch gear, a platform or bed of general rectangular form has upstanding walls providing bearings for an overhung drum or barrel shaft, which with or without an auxiliary support bearing, may be furnished with a warp end and upon which approximately centrally of the platform is disposed the worm wheel of the reduction gear.

Immediately below this worm wheel and running transversely of the platform in suitable bearings is the aforementioned main shaft carrying a worm enmeshed with the worm wheel and, on a projection, the aforementioned holding and lowering brake with an interposed unidirectional clutch or free wheel.

The driving motor is carried, preferably on a separate bed adjacent the platform, in axial alignment with the main shaft, any appropriate form of readily detachable coupling connecting the motor shaft with a jack-shaft carrying the sun wheel of the aforementioned differential or epicyclic gearing.

The internally toothed ring member of such gear is fixed for rotation with the main worm shaft, while the planet carrying cage is connected to the drum of the hoisting brake, which may be a facsimile of the aforementioned holding brake, the arrangement being such that when the hoisting brake is applied and the planet cage held against rotation, a reduced ratio drive is transmitted from the motor shaft to the main or worm shaft.

Also associated with the drum of the hoisting brake is an overhauling clutch, preferably a friction clutch, which is normally disengaged but which, when actuated, couples the planetary system to the jack-shaft thereby fixing the epicyclic train for bodily rotation whereon the drum is driven in the reverse direction to normal and at double speed for driving down the empty hook.

Preferably, in accordance with co-pending application Serial No. 152,450, filed July 7, 1937, the winch gear is provided with controlling apparatus including interlocking means preventing the brakes, clutches and other elements to be controlled from being operated in other than a predetermined sequence, or sequences, and advantageously the controls are grouped and connected to a single control wheel equipped it may be with a dead man's handle, so that on release it always returns to safety position in which the operating parts are retained stationary.

The invention will be further described with reference to the accompanying drawings where one preferred embodiment of winch gear is illustrated and wherein:

Fig. 3 is a partly diagrammatic elevational view of the brake and clutch gear with its associated control mechanism, Figs. 4, 5 and 6 being diagrammatic detail views of the actuating controls respectively of the hoisting brake, the holding and lowering brake, and the overhauling clutch.

Figure 1:
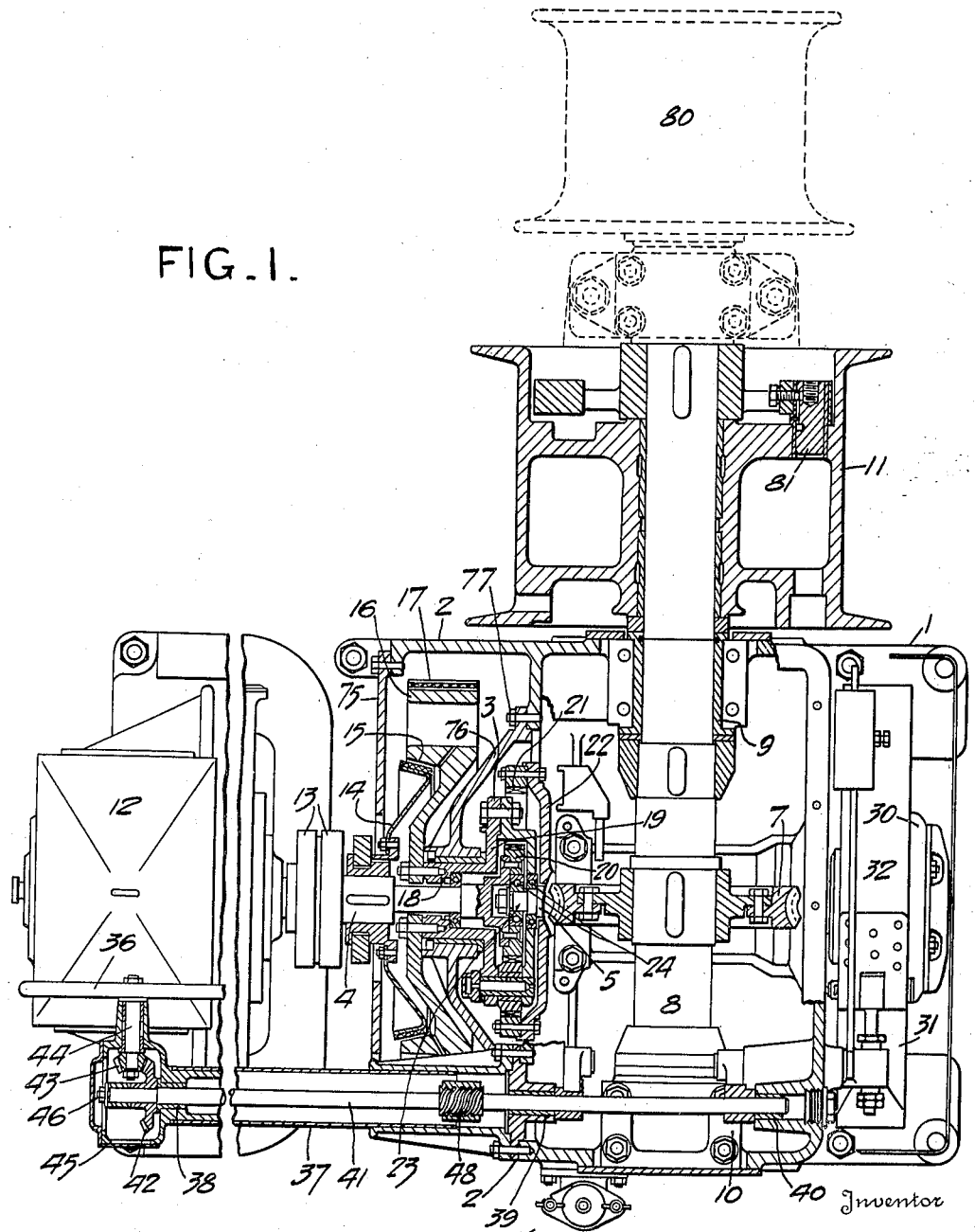
Fig. 1 is a horizontal section of the winch clearly showing the quadrated disposition of the barrel shaft to the motor and main shafts.
Figure 2:
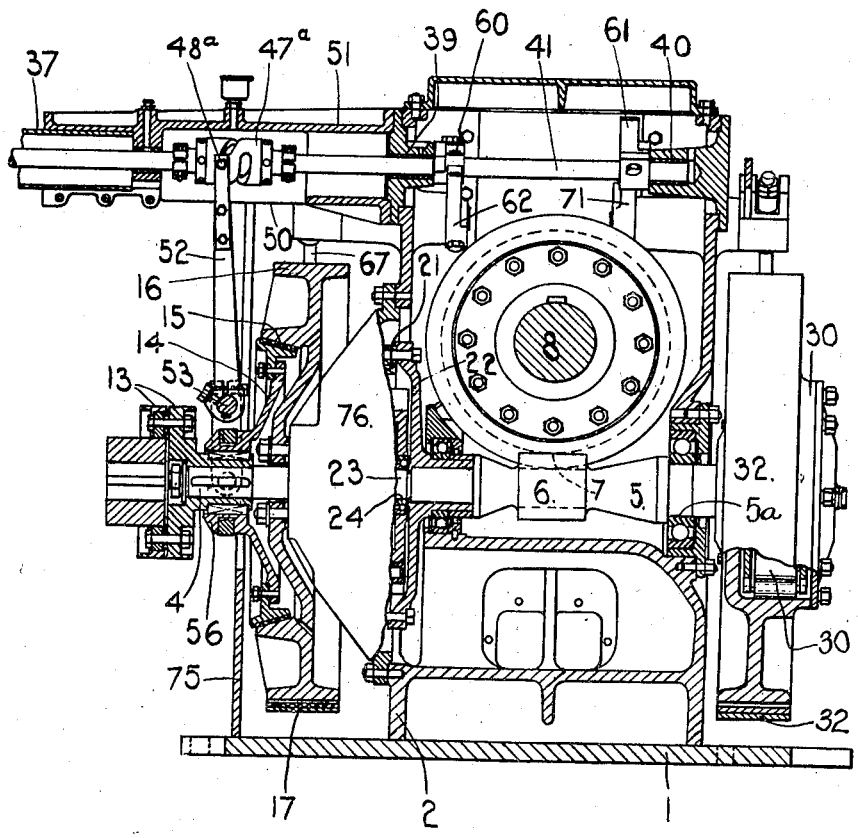
Fig. 2 is a part vertical section of the winch.

Referring now to the drawings, but first more particularly to Figures 1 and 2, the winchgear is carried by a base plate or platform 1 from which upstands preferably an integral housing 2 constituting a gear box for the driving mechanism including the epicyclic gearing, generally designated 3, coupling a jack-shaft 4 with the main or power shaft 5 upon which is a worm 6 enmeshed with a worm wheel 7 on a shaft 8 suitably carried in bearings 9 and 10 provided in the housing 2 and mounting externally of the housing the main drum or barrel 11.

12 represents an electric driving motor, the shaft whereof is connected to the jack-shaft 4 by a coupling 13 which may be of any appropriate readily detachable type to facilitate removal of the motor when necessary, the jack shaft 4 carrying and having fixed for rotation with it the sliding element of an overhauling clutch 14, the cooperating part whereof is an internal frusto-conical face 15 of the drum 16 of the hoisting brake 17.

The drum 16 is connected by a sleeve 18 encircling the jack-shaft 4 with the planet carrying cage 19 of the epicyclic gearing 3, the sun wheel 20, whereof is fixed on the end of the jack-shaft 4.

The internal toothed race 21 for the planets is carried by a disc 22 fixed on the adjacent end of the main shaft 5 which, as shown at 23, is spigoted within the juxtaposed end of the jack-shaft 4, ball races 24 providing an anti-friction bearing between the two shafts and also for the planet cage 19.

The main shaft 5 is extended through a bearing 5a in the wall of the housing 2 remote from the motor and mounts through a unidirectional clutch or free wheel 30 the drum 31 of a holding and lowering brake 32, a compact and symmetrical arrangement of the parts being thus obtained.

In operation when the motor 12 is rotating and driving the jack-shaft 4, it will be understood that the holding and lowering brake 32 is normally on and that the hoisting brake 17 and the overhauling clutch 14 are normally open, the cage 19 of the epicyclic gearing simply revolving idly without imparting rotation to the barrel shaft 8.

For hoisting, the hoisting brake 17 is applied, whereon the cage 19 is held stationary via the drum 16 and sleeve 18 and rotation is thus imparted to the main shaft 5 via the toothed ring 21 of the epicyclic train, and from such main shaft through the worm reduction gear to the barrel shaft 8.

Immediately the hoisting brake 17 is opened, the holding and lowering brake 32 maintains the load in hoisted position until released, or if it is desired to drive down the empty hook, the overhauling clutch 14 is engaged, which, coupling the jack-shaft 4 mounting the sun wheel 20 to the drum 16 fixed for rotation with the planet carrying cage 19, locks the epicyclic train for bodily rotation, and thus rotates the main shaft 5 in the reverse direction at double speed.

The control of the various operations is unified at a single control wheel 36, the operation of which will now be described with reference also to Figs. 3 to 6.

The control wheel 36 is conveniently disposed over a platform providing a cover for the driving motor 12 being carried by a tubular extension 37 parallel with the main and motor shaft and providing bearings 38, 39 and 40, for a control shaft 41, one end of which mounts a bevel wheel 42 enmeshed with a bevel wheel 43 on the spindle 44 of the control wheel 36. The bevel wheels 42 and 43 are housed in a casing 45 mounted on the end of the tubular extension 37 and equipped with a small cover plate 46, by removal of which access can be had for inspection, or for withdrawal of the control shaft 41.

As more clearly shown in Fig. 3, the shaft 41 mounts a screw threaded sleeve 47 upon which rides a nut 48, having a projection 49, which slides in a slot 50 provided for the purpose in a cylindrical guide 51, so as to hold the nut against rotation while permitting it to move longitudinally of the shaft 41 when driven therealong by rotation of the shaft and its associated screw threaded sleeve 47.

The projection or abutment 49 also serves for the actuation of a lever 52, carried by a cross shaft 53 pivoted in bearings 54 on the main housing 2 and carrying a yoke or toggle levers 55 connected to the withdrawal collar 56 of the overhauling clutch 14.

A tension spring 57, normally urges the lever 52 in a direction to disengage the clutch 14, and the connection between the abutment 49 and the upper end of the lever 52 is adjustable by means of a set screw 58. It will be appreciated that by rotating the control wheel 36 in one direction, the shaft 41 is revolved and moves the nut 48 to the left in Fig. 2, thus rocking the lever 52 on its cross shaft 53, and thereby engaging the overhauling clutch 14, with its counter part 15 on the drum 16 of the hoisting brake.

In Fig. 2, a slightly modified arrangement of actuating gear for the overhauling clutch is shown, comprising a helically grooved member 47a on the shaft 41 co-operating with a yoke 48a on the upper end of the lever 52 to operate this lever for actuating the overhauling clutch 14.

The shaft 41 also mounts cams 60 and 61 for the actuation respectively of the hoisting brake 17 and the holding brake 32 to apply the former which is normally released, and to release the latter, which is normally applied.

As will be seen more clearly by reference to Fig. 4, the cam 60 co-operates with a rock lever, or tappet 62 carried by a spindle 63 borne at 64 in the housing 2 and having at its other end a cam 65 which, according to its position, determines the tension on the band of the hoisting brake 17. One end of the band is carried by a stationary support 66 and the other movable end is adjustably associated with the cam 65 by means of a screw threaded stem 67, nuts 68, whereon, enable the degree of application of the brake to be varied. A counterweight similar to that shown at 74 in Figure 5 may return the hoisting brake to release position, or as shown a compression spring 69 may be utilised to this end.

The holding and lowering brake 32, is similarly controlled but in the reverse direction, an arm or tappet 71 co-operating with the cam 61 and carrying on its spindle 72 a brake release cam 73, and a counterweight 74 which tends to rock the spindle 72 in a direction to engage the holding brake 32.

The relative disposition of the nut 48 for the overhauling clutch 14, the cam 60 for the hoisting brake 17, and the cam 61 for the holding brake 32, is such that in the normal mid-position of the control wheel 36, none of them is operative, i. e., the holding brake 32 remains applied, the hoisting brake 17 is released, and the clutch 14 is open.

Movement of the control wheel in one direction from its neutral position operates through the cam 60 to close the hoisting brake and couple the motor 12 with the barrel shaft 8 for hoisting, return of the control wheel 36 to neutral position relasing the hoisting brake 17, when the parts remain stationary the main shaft 5 being held by the holding brake 32.

For lowering, the control wheel 36 is moved in the other direction from this neutral position, whereat the cam 61 actuates through the tappet 71, to release the holding brake 32 and permit of the load being lowered.

If the hook is empty, or it is desired to drive down a light load, the control wheel 36 is moved further in this direction, whereat the screw 47 or helix 47a trips the lever 52 to engage the overhauling clutch 14 and lock the epicyclic train for bodily rotation to drive the barrel shaft 8 in the lowering direction.

It will be appreciated that the mechanism may be totally enclosed in the housing 2 if desired although in the embodiment illustrated the holding and lowering brake 32 is mounted externally of the housing.

The parts are readily accessible for inspection or withdrawal on removal of the motor 12 as aforementioned, and as will be seen by reference to Fig. 1, by removal of the end cover 75, access is immediately had to the hoisting brake 17, the overhauling clutch 14 and their associated parts. Moreover, for withdrawal of the epicyclic and worm gear assembly, all that is necessary is the withdrawal of the end wall 76 of the housing by undoing the nuts 77 whereat the jack-shaft 4 and the main shaft 5 with the components they carry, may be withdrawn axially through the open end of the housing.

The epicyclic train may be designed to give any selective reduction in conjunction with the worm gear, an appropriate ratio being 2-1 as shown.

The epicyclic gearing 3 and worm and worm wheel may be arranged to run in oil, provision being also made to lubricate the rotating parts of the brakes and clutches.

In certain cases the free wheel 30 may be omitted and in this event the actuating gear of the holding brake 32 and that of the hoisting brake 17 will preferably be so inter-coupled that the former is released as the latter is applied and is re-applied as the drum shaft 8 is uncoupled from the motor by release of the hoisting brake.

Also it may be convenient when employing a warp end such as is shown at 80 carried by the extremity of the drum shaft 8 to unlock the main drum 11 from such shaft for which purpose the readily accessible abutment 81 is furnished.

It will be understood that when embodied as a multi-barrel winch or one made up of a plurality of single drum units, a common driving motor may be employed for the general barrels and may be mounted on a separate bedplate, although for single drum winches the motor may be mounted on the main winch bed 1.

By the present invention an improved construction of winch is provided with which accurate and responsive control of the drum is obtained.

What I claim is:

1. Winchgear comprising a shaft mounting the winch drum, a brake carrying shaft coupled to the drum shaft through reduction gearing, a holding brake mounted at one end of said brake carrying shaft through the medium of a unidirectional clutch and holding the drum against movement in the lowering direction, and an epicyclic reduction gearing coupling the other end of such brake carrying shaft to its prime mover, said epicyclic gearing including a hoisting brake providing a reduced ratio drive for hoisting and an overhauling clutch providing an overdrive in the reverse direction for rotating the drum to drive down the empty hook.

2. Winchgear according to claim 1, wherein the brake carrying shaft is disposed at right angles to the drum shaft with an intermediate worm drive and mounts at one end the ring or race of the epicyclic train, the sun wheel of such train being mounted on the driving shaft, and the planet cage being controlled by the hoisting brake adapted to hold it stationary for hoisting and by the overhauling clutch adapted to couple it to the driving shaft to lock the epicyclic gearing for solid rotation in the reverse direction when running down the empty hook.

3. Winchgear according to claim 1 including a housing enclosing the reduction and epicyclic gearings and providing bearings for the said shafts, the hoisting brake being mounted on an extension of its shaft externally of the housing at one side, and the hoisting brake and overhauling clutch being symmetrically disposed externally of the housing at the other side, and a driving motor removably positioned adjacent said other side of the housing.

4. Winchgear comprising a housing, bearings in said housing carrying a shaft having an extension mounting the winch drum, a brake carrying shaft coupled to the drum shaft through worm reduction gearing a unidirectional clutch and an external holding brake mounted at one end of said brake carrying shaft for holding the drum against movement in the lowering direction, and an epicyclic reduction gearing coupling the other end of such brake carrying shaft to its prime mover, said epicyclic gearing including a hoisting brake externally of the housing providing a reduced ratio drive for hoisting and an overhauling clutch providing an overdrive in the reverse direction for paying out.

GEORGE THOMAS MACFARLANE.